United States Patent
Jarisch et al.

(10) Patent No.: US 11,039,711 B2
(45) Date of Patent: Jun. 22, 2021

(54) BEVERAGE SYSTEM

(71) Applicant: NESTEC S.A., Vevey (CH)

(72) Inventors: Christian Jarisch, Lutry (CH); Nicolas Camier, Brignais (FR)

(73) Assignee: Societe des Produits Nestle S.A., Vevey (CH)

( * ) Notice: Subject to any disclaimer, the term of this patent is extended or adjusted under 35 U.S.C. 154(b) by 359 days.

(21) Appl. No.: 15/769,557

(22) PCT Filed: Oct. 19, 2016

(86) PCT No.: PCT/EP2016/075065
§ 371 (c)(1),
(2) Date: Apr. 19, 2018

(87) PCT Pub. No.: WO2017/067972
PCT Pub. Date: Apr. 27, 2017

(65) Prior Publication Data
US 2018/0310751 A1 Nov. 1, 2018

(30) Foreign Application Priority Data
Oct. 23, 2015 (EP) ..................................... 15191164

(51) Int. Cl.
*A47J 31/44* (2006.01)
(52) U.S. Cl.
CPC ........... *A47J 31/4485* (2013.01); *A47J 31/44* (2013.01); *A47J 31/4403* (2013.01); *A47J 31/4496* (2013.01)
(58) Field of Classification Search
CPC .... A47J 31/4485; A47J 31/44; A47J 31/4403; A47J 31/4496
See application file for complete search history.

(56) References Cited

U.S. PATENT DOCUMENTS

| 2005/0118319 A1 | 6/2005 | Green et al. | |
| 2012/0125202 A1* | 5/2012 | Remo | A47J 31/60 99/286 |
| 2013/0276636 A1* | 10/2013 | Rithener | A47J 31/4403 99/285 |

FOREIGN PATENT DOCUMENTS

| AU | 646379 | 2/1994 |
| CN | 102469890 A | 5/2012 |
| (Continued) | | |

OTHER PUBLICATIONS

Chinese Office Action for Chinese Patent Appl No. 2016800609036 dated Nov. 27, 2019.

*Primary Examiner* — David P Bryant
*Assistant Examiner* — Nirvana Deonauth
(74) *Attorney, Agent, or Firm* — K&L Gates LLP

(57) ABSTRACT

The invention relates to a beverage system (100) for providing beverage recipes comprising a foamable fluid unit (10) and one or more beverage units (200, 202), wherein the foamable fluid unit (10) is configured to provide a fluid and/or a foamed fluid directly into a container (12), the fluid system in the fluid unit (10) being continuously refrigerated up to the fluid delivery outlet during the preparation and during stand-by of the system (100); and wherein the beverage units (200, 202) are configured to dispense a beverage over the fluid and/or foamed fluid dispensed, without this beverage passing through any refrigerated area of the foamable fluid unit (10). The foamable fluid unit (10) comprises one or more fluid outlets (13, 13') delivering the fluid and/or foamed fluid directly into the container (12), the beverage units (200, 202) comprising one or more separate beverage outlets (14, 14') delivering the beverage over the fluid and/or foamed fluid into the container (12).

16 Claims, 11 Drawing Sheets

(56) References Cited

FOREIGN PATENT DOCUMENTS

| | | |
|---|---|---|
| CN | 104936487 A | 9/2015 |
| EP | 0803220 | 10/1997 |
| EP | 0803220 A1 | 10/1997 |
| WO | 2011015963 | 2/2011 |

* cited by examiner

BEVERAGE SYSTEM

CROSS REFERENCE TO RELATED APPLICATIONS

The present application is a National Stage of International Application No. PCT/EP2016/075065, filed on Oct. 19, 2016, which claims priority to European Patent Application No. 15191164.1, filed on Oct. 23, 2015, the entire contents of which are being incorporated herein by reference.

FIELD OF THE INVENTION

The present invention relates to a beverage system, particularly to a system able to provide different beverage recipes based on chilled, cold, ambient or hot milk and/or milk foam and preferably coffee, the system being very easy to clean and allowing an easy and completely hygienic use.

BACKGROUND OF THE INVENTION

When different coffee-based beverages are intended to be prepared, typically a standard coffee machine delivers into a cup coffee first and then milk is added by an external module connected to this coffee machine. Typically, milk is added by a pipe or duct or tube, preferably flexible, from the milk module to the cup. The milk module maintains milk refrigerated for hygienic reasons and then conducts this milk towards the coffee machine externally. The problem of these known systems is cleaning of the pipe through which milk is conveyed to the coffee machine: in order to keep the product hygienic, the cleaning of the pipe has to be done very frequently and even the pipes need to be changed after short periods of time, which is not practical, is costly and can even lead to hygienic issues.

There exist in the state of the art milk foaming machines which are able to provide foams and hot milk foams. These known machines use different types of foaming, heating and milk storing solutions. Professional milk foaming machines used in business applications are frequently used along the day: they typically comprise a metallic milk container, preferably made in stainless steel, where milk is stored and is kept refrigerated at a temperature typically of around 4° C. in order to correctly and hygienically preserve it until it is going to be used and delivered as milk foam. The problem is that, at the beginning of the day, milk is effectively at a low temperature of 4° C. but, as the day goes by, milk temperature increases and, either the container needs to be removed and stored in the fridge for some time, or milk temperature increases above the allowable limit (typically stablished at around 15° C.): in the first case, the system is not friendly for the user and, in the second case, hygiene problems may arise. Other solutions provide these machines with a compressor that keeps continuously refrigerated the milk container.

Typically, these milk foaming solutions are used attached or linked to standard coffee machines, so the coffee machine provides the coffee beverage and then the recipe is finished by the adding of milk and/or milk foam coming from these known foaming devices. However, not only there are problems with the conveying of the milk and/or milk foam towards the coffee machine but, also, these current known solutions of foaming have serious disadvantages in terms of user friendliness, handling and cleaning. As explained, typical professional solutions have a milk fridge (milk container that is kept refrigerated), a milk fluid system, optionally a milk heating system and a foaming device. All these existing solutions have the milk fluid system, the heating and the foaming device outside the refrigerated area, needing complex cleaning procedures after each foam preparation or at least after each day of use.

Therefore, the present invention provides a beverage system able to dispense beverage recipes, preferably coffee-based beverage recipes, the system allowing very simplified cleaning and handling, avoiding complex cleaning and rinsing cycles and avoiding any hygiene problems as in standard solutions.

The present invention comes to provide a solution to the above-described needs, as it will be further explained. The invention also aims at other objects and particularly at the solution of other problems as will appear in the rest of the present description.

SUMMARY OF THE INVENTION

According to a first aspect, the invention relates to a beverage system for providing beverage recipes comprising a foamable fluid unit and one or more beverage units, the foamable fluid unit being configured to provide a fluid and/or a foamed fluid directly into a container, the fluid system in the fluid unit being continuously refrigerated up to the fluid delivery outlet during the preparation and during stand-by of the system. The beverage units are configured to dispense a beverage over the fluid and/or foamed fluid dispensed, without this beverage passing through any refrigerated area of the foamable fluid unit.

Preferably, the foamable fluid unit of the beverage system of the invention comprises one or more fluid outlets delivering the fluid and/or foamed fluid directly into the container, the beverage units comprising one or more separate beverage outlets delivering the beverage over the fluid and/or foamed fluid into the container.

Typically, the beverage system comprises a unique positioning area for the container depending on its size, independently on the beverage recipe that will be prepared.

According to the invention, the foamable fluid unit and the one or more beverage units in the beverage system are preferably modularly configured, these units being able to work independently.

Typically, in the beverage system of the invention, the fluid in the foamable fluid unit is milk and the beverage dispensed by the one or more beverage units is coffee.

In one embodiment of the invention, the foamable fluid unit comprises two distinct cooling units intended to refrigerate a fluid container where the foamable fluid is kept and a foaming device where the fluid is foamed, separately. Typically, one cooling unit refrigerates a primary compartment where the fluid container is arranged and another cooling unit refrigerates a cooling block configured to contour and refrigerate the foaming device. Preferably, the primary compartment comprises a cooling block cooperating with a cavity in the fluid container and cooling walls refrigerating the sides of the fluid container.

In another embodiment of the invention, the foamable fluid unit comprises one cooling unit configured to refrigerate a block, the block comprising an inner volume to receive the container and an insert part configured to receive the foaming device.

Preferably, the beverage system of the invention comprises a top opening provided with an air entry and a steam entry configured to cooperate with corresponding air and steam entries in the foaming device when the top opening closes over the foaming device. Typically, the beverage system of the invention further comprises at least one valve to control the air and/or steam entries in the top opening.

The foaming device typically comprises at least a first body and a second body comprising cavities to configure fluid conduits when assembled together; these bodies being joined by means of a joining element allowing folding and unfolding of the said bodies a plurality of times. Preferably, the joining element is configured as a hinge. Also, the joining element can further comprise one or a plurality of clamping elements. Typically, the bodies of the foaming device are configured as halves comprising complementary cavities that constitute the fluid conduits when brought together.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1:
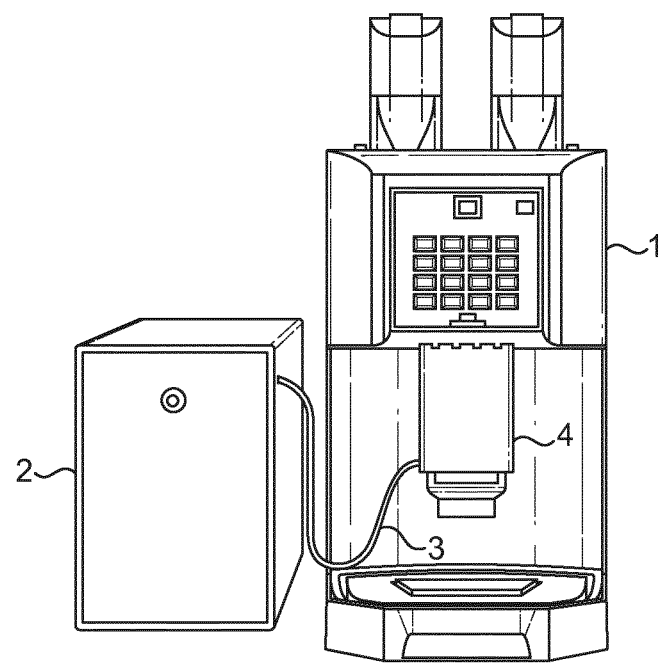
FIG. 1 shows a standard coffee-based beverage system according to the known state of the art.
Figure 3:
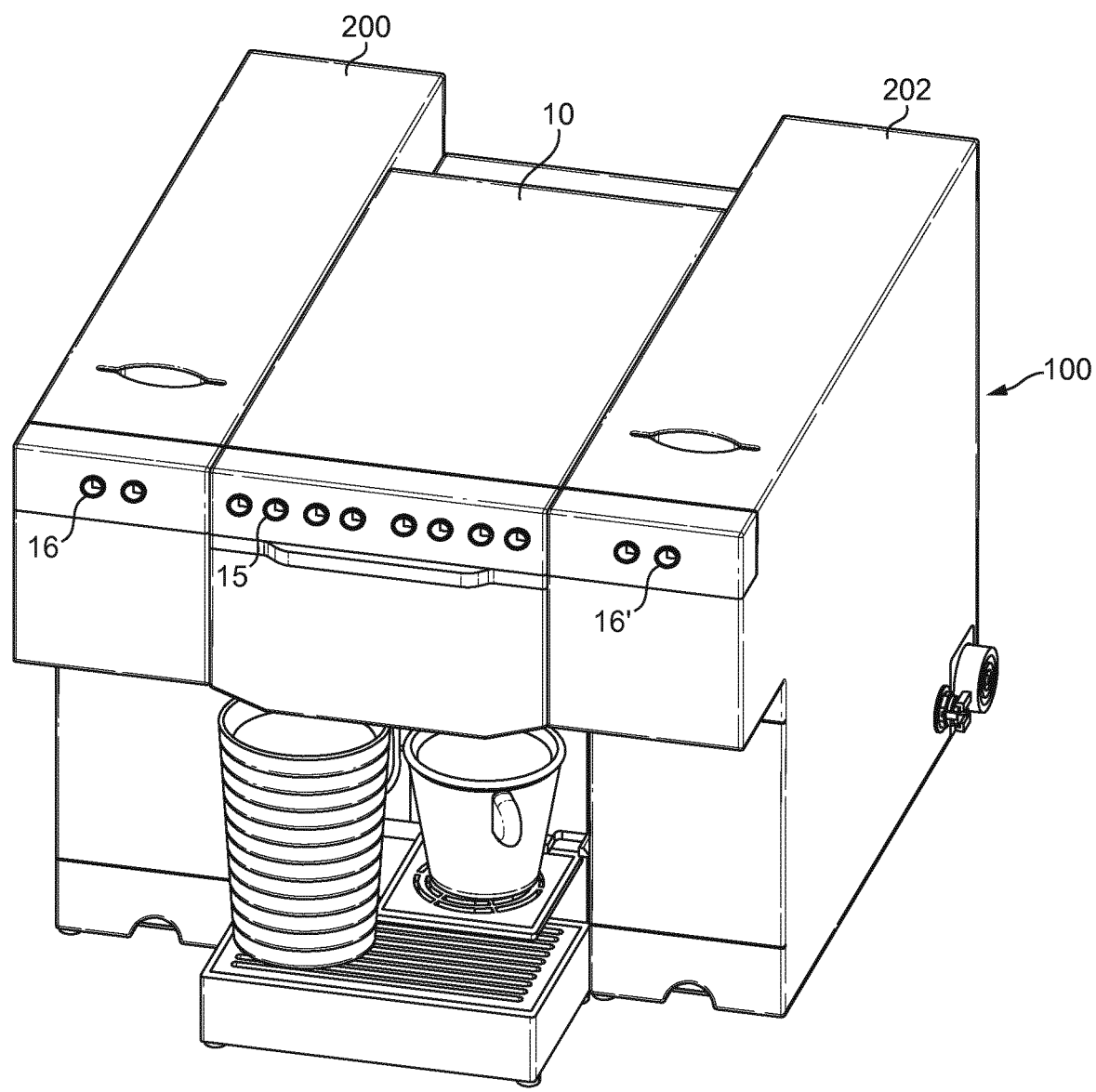
FIG. 3 shows a coffee-based beverage system according to the present invention, comprising one milk unit and two coffee units.
Figure 4:
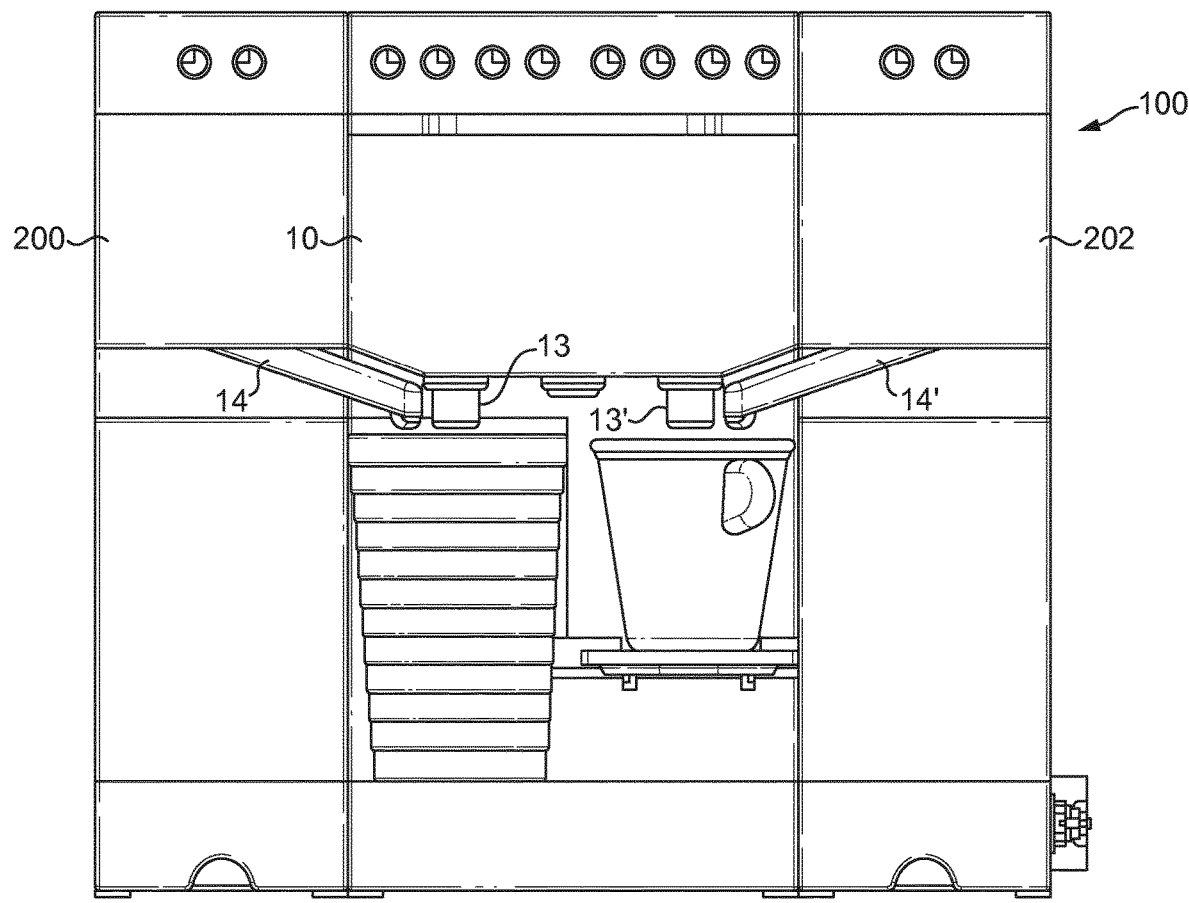
FIG. 4 shows a frontal view coffee-based beverage system shown in FIG. 3.

As schematically shown in any of FIG. 3 or 4, for example, the invention relates to a beverage system 100 preferably providing coffee-based beverage recipes. The system 100 comprises a milk unit 10 and one or more coffee units 200, 202. The system of the invention works in the opposite way as those known in the prior art, as represented schematically in FIG. 1: known systems comprise a standard coffee unit 1 delivering coffee through an outlet unit 4, to which a pipe 3 coming from a milk unit 2 is connected. As shown in FIG. 1, the milk pipe 3 is conveyed outside any refrigerated area of the system so it needs to be frequently cleaned and, moreover, can present hygiene problems because of the milk remaining inside the pipe 3 and not being in cold conditions.

Contrary to the system in FIG. 1, the system 100 of the invention comprises a milk unit 100 providing milk and/or milk foam, such that the milk is continuously refrigerated in said unit, during the storage of it in the unit and up to its dispensing into a cup, as it will be further explained in detail. In fact, it is the fluid system, through which the fluid circulates, in the fluid unit 10 which is refrigerated continuously from the container or storage of the fluid up to the outlet or delivery outlet of the fluid prepared, which goes directly into the cup 12. Really, there is no part which is in contact with the fluid in the fluid unit 10 that is not refrigerated.

Therefore, according to the invention, milk is dispensed in direct flow and the additional beverage (typically coffee, though the invention is not limited to coffee-based beverages only) is brought over that milk outlet. As shown in FIG. 1, standard known systems have a direct coffee outlet and milk is brought over that coffee outlet by additional pipe or tubing that need to be cleaned afterwards.

Figure 2:
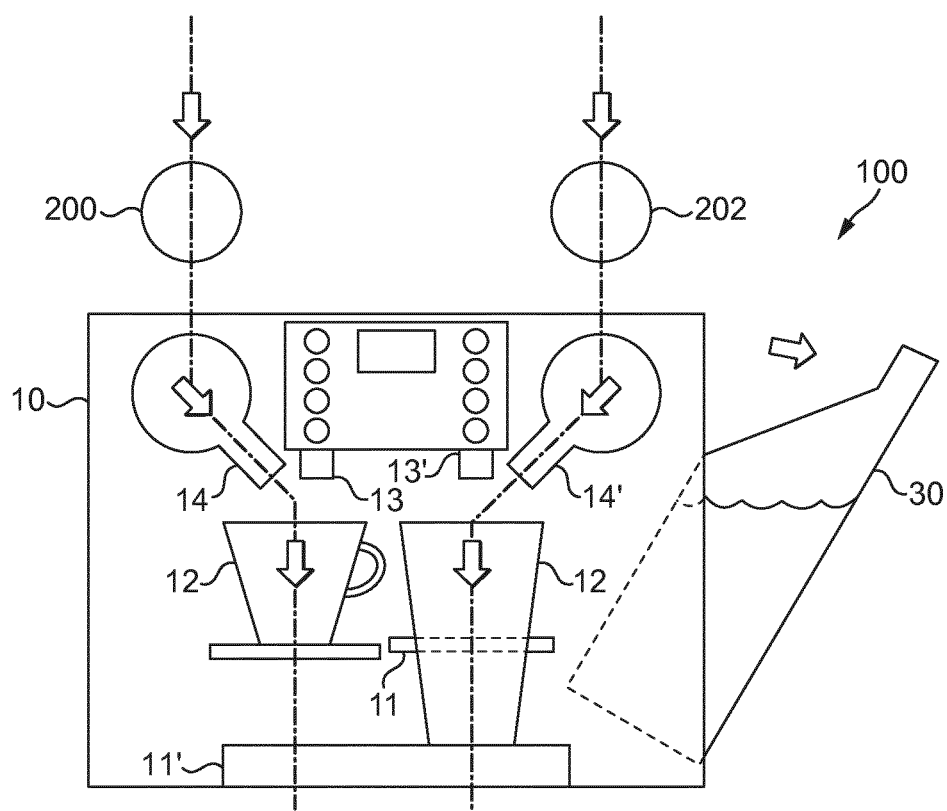
FIG. 2 shows a general view of the coffee-based beverage system according to the present invention.

FIG. 2 shows for example a system 100 according to the present invention, comprising a milk unit 10 and two coffee units 200 and 202. The milk unit 10 comprises two milk outlets in direct flow, 13 and 13', directly dispensing milk and/or milk foam into a cup 12. The system comprises two milk outlets and each one is used depending on the size of the cup 12 used to prepare the recipe. The system 100 further comprises two coffee outlets 14 and 14', bringing coffee over the corresponding milk outlet, 13 and 13'. Thus, coffee can be conveyed externally and over the milk outlet as it has no hygiene problems: milk, which certainly poses hygiene problems, is kept refrigerated in the milk unit 10 and is kept refrigerated up to its dispensing in the cup 12. Cleaning is therefore not an issue in the beverage system of the present invention.

Moreover, another advantage of the invention is that the user has only one positioning for the cup where the beverage will be prepared: the system 100 comprises in fact two positioning trays, 11 and 11', for small and big cups, respectively, as shown in FIG. 2 or FIG. 4, for example. Thus, the user will not be confused and will only have one possibility for placing its cup in the system, independently on the beverage recipe that will be prepared.

In fact, in the system of the invention, for effectiveness, coffee is avoided to pass through the refrigerated area in the milk unit 10, so it is conveyed around and outside the said refrigerated area.

Figure 5:
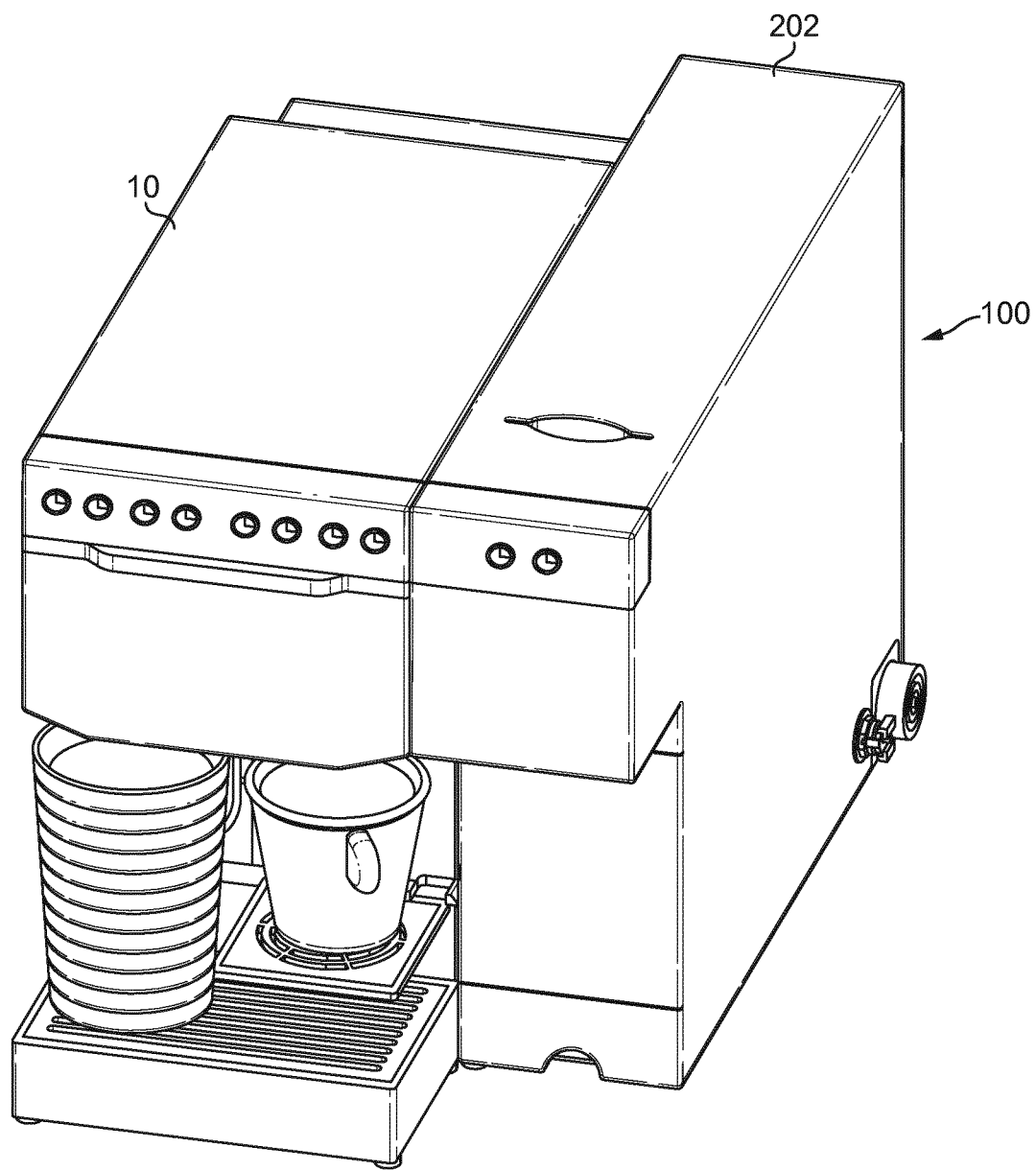
FIG. 5 shows a coffee-based beverage system according to the present invention, comprising one milk unit and one coffee unit on the right side.
Figure 6:
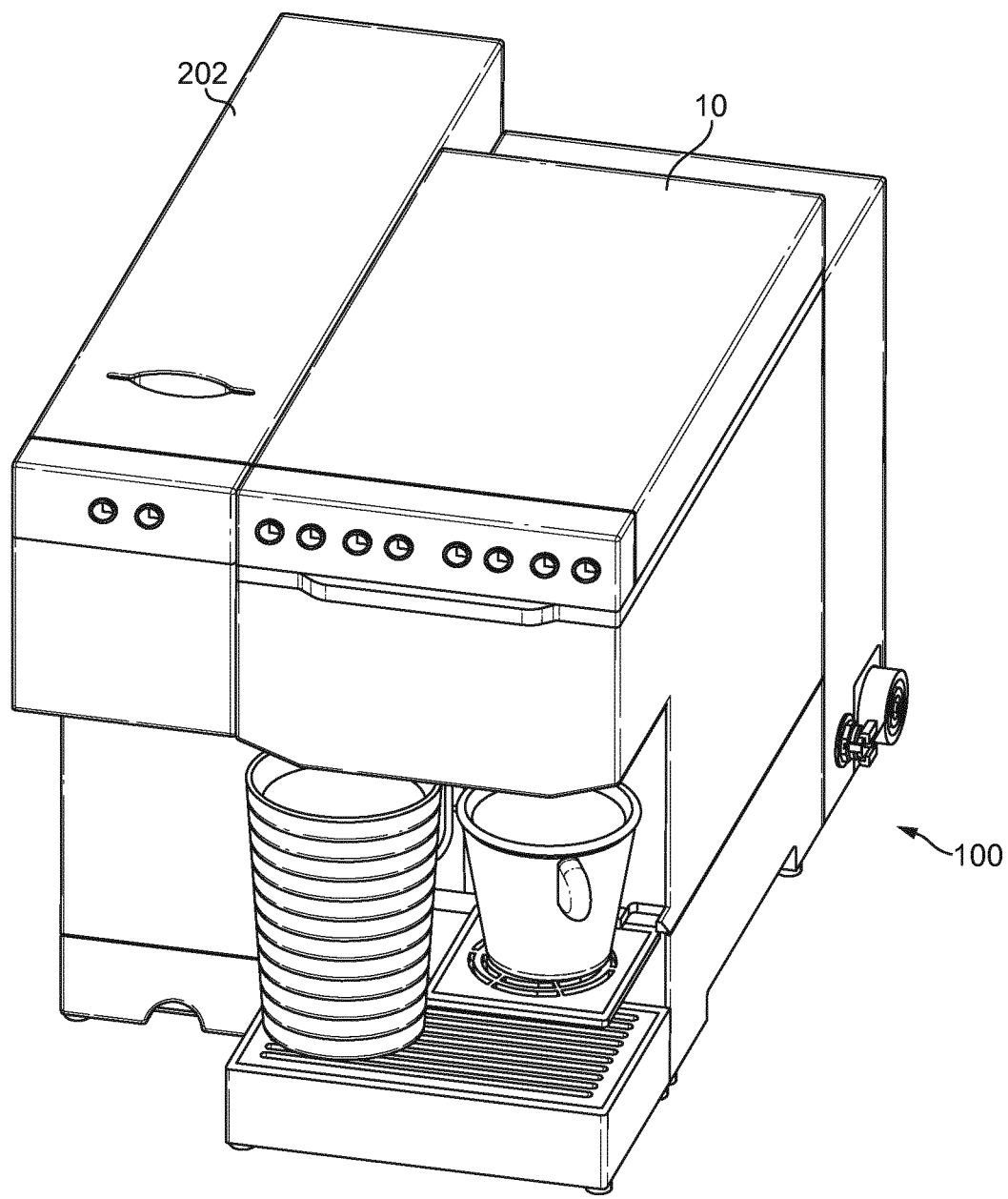
FIG. 6 shows a coffee-based beverage system according to the present invention, comprising one milk unit and one coffee unit on the left side.

Several modular configurations of the system 100 of the invention are possible: typically, a milk unit 10 is provided and is further connected or linked to one (as shown in FIG. 5 or 6) coffee unit 200 or to two coffee units 200, 202 (as shown in FIG. 3 or 4). The system 100 will further be provided with control indicators and user actuation means for the milk unit and for the coffee units 15, 16 and 16', respectively. The idea of the system is therefore to be configured as a one-touch system such that the user, only by pressing the appropriate button or buttons in the actuation means 15, 16 and/or 16', would simply select the desired beverage recipe.

Modularity of the system 100 will be configured such that it will comprise one milk unit 10 as a central or reference unit and then one or more coffee units 200, 202 will be plugged to it. The coffee units will be configured such that, when not plugged or linked to the milk unit, they will be able to work as stand-alone units: this is why the coffee units are provided with independent user actuation means 16, 16'. Similarly, the milk unit 10 can also work as a stand-alone unit and is therefore provided with its own actuation means 15.

The system offers the user the possibility of various beverage recipes such as only coffee, only milk, coffee and milk various recipes, foamed or not foamed beverages and also hot, cold or ambient beverages.

When talking about milk in the present invention, it should be understood not only pure milk but also milk-based fluids having a major weight proportion of pure milk. Also in the present invention, frothing, foaming or whipping should be understood as synonyms.

Figure 7:
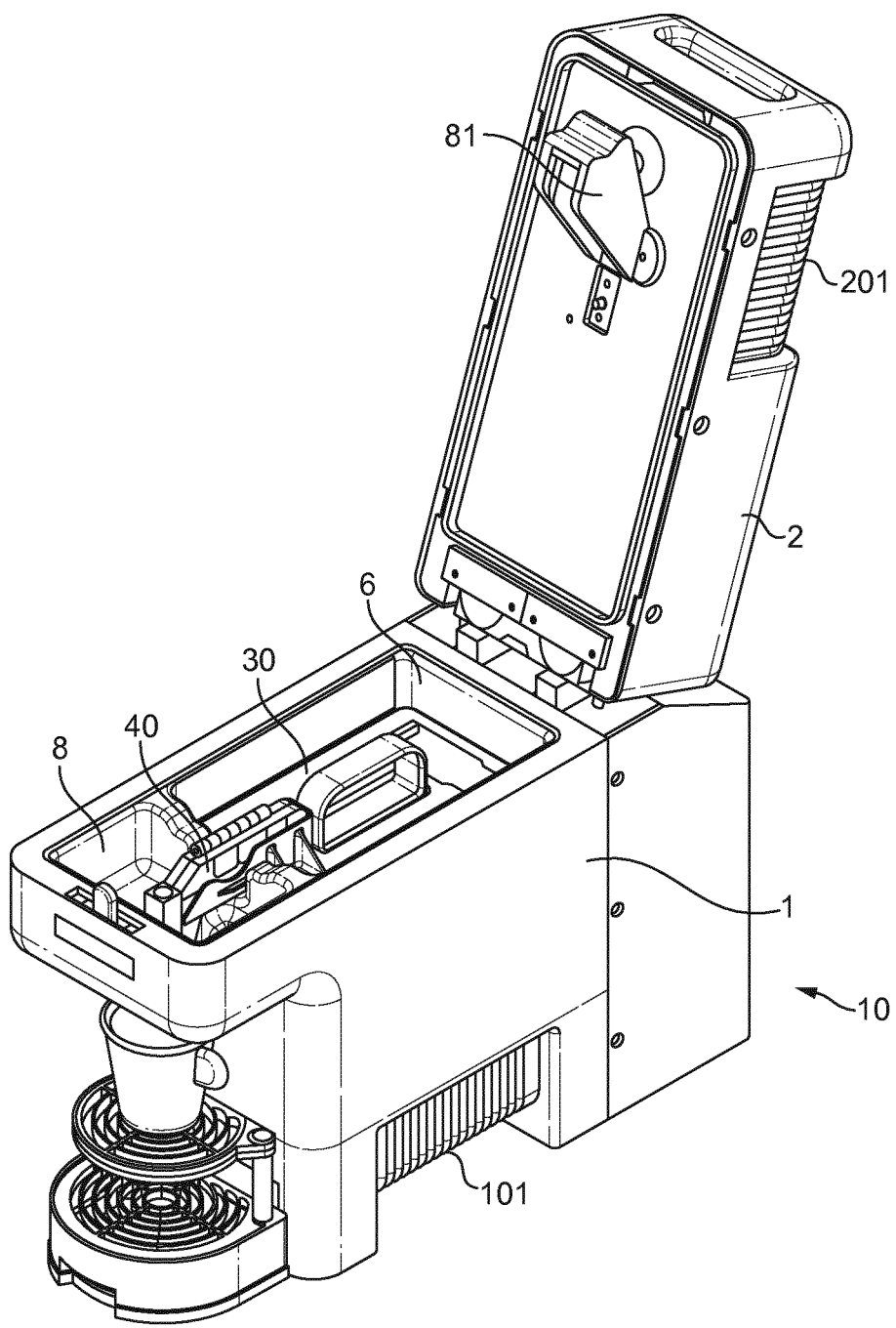
FIG. 7 shows a detailed view of the milk unit, in an open position, used in a coffee-based beverage system according to the present invention.
Figure 8:
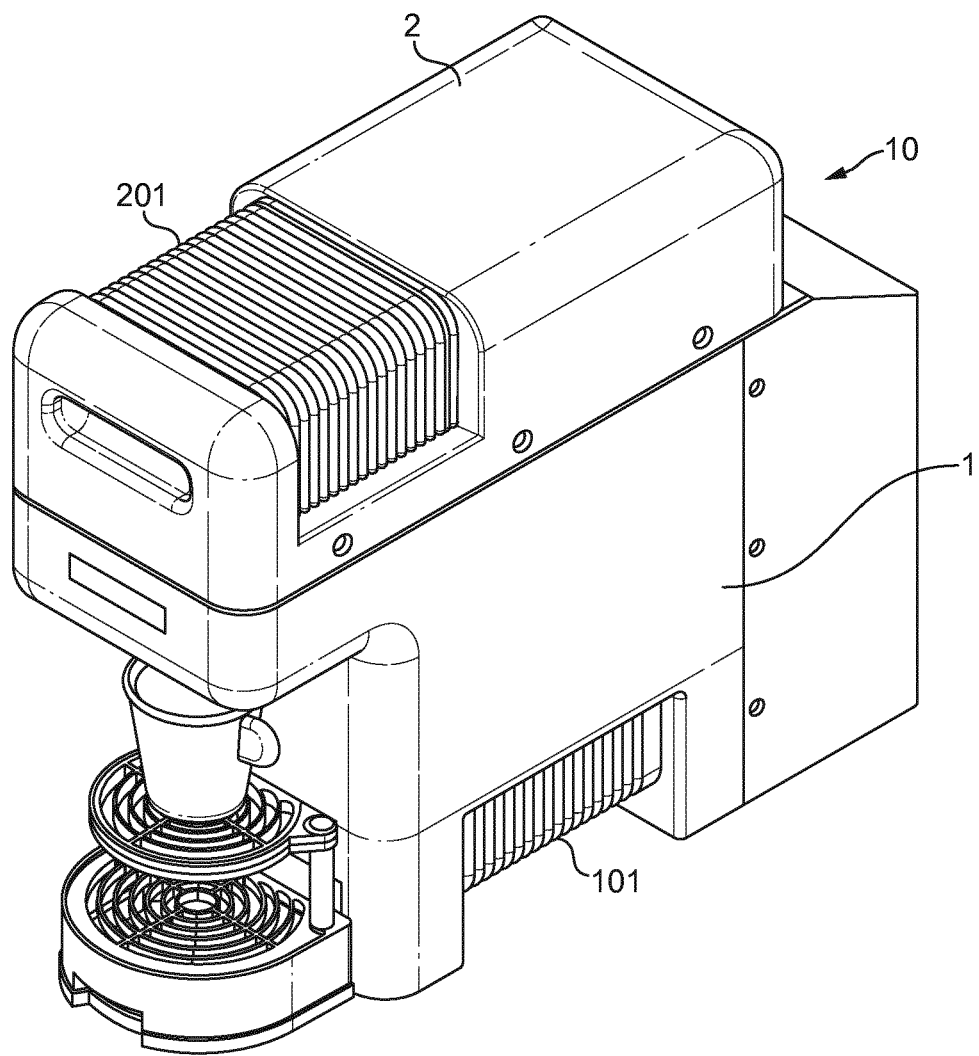
FIG. 8 shows a detailed view of the milk unit, in closed position, used in a coffee-based beverage system according to the present invention.

Referring now to FIGS. 7 and 8, a milk unit 10 is represented, shown in an open and a closed position, respectively. As shown in FIG. 7, the opening of the unit 10 is done on the top, which is particularly advantageous as it reduces the temperature increase of the fluid during filling of it into the fluid container 30. As shown in FIG. 7, the milk unit 10 comprises a housing 1 having a primary refrigerated compartment 6 where the fluid container 30 can be inserted together with its associated foaming device 40. The foaming device 40 is placed in a secondary refrigerated compartment 8 in order to keep the temperature cold at the fluid outlet. Both primary and secondary refrigerated compartments 6, 8 are accessible via a top opening 2 reducing the cold temperature loss to a minimum. The milk unit 10 preferably comprises two separated cooling units: a first cooling unit 101 refrigerating the primary refrigerated compartment 6 where the fluid container 30 is inserted, and a second cooling unit 201 refrigerating the secondary refrigerated compartment 8 in contact with the foaming device 40. According to such embodiment, the fluid is maintained refrigerated when it is stored in the container 30 and until it has actually been foamed and it is delivered through the outlet; therefore, it is maintained refrigerated during all the steps and in all parts of the unit 10 which avoids complex cleaning procedures of this milk unit 10 and any need of rinsing operations as there is no milk that can be damaged and that can remain inside this unit.

Figure 9:
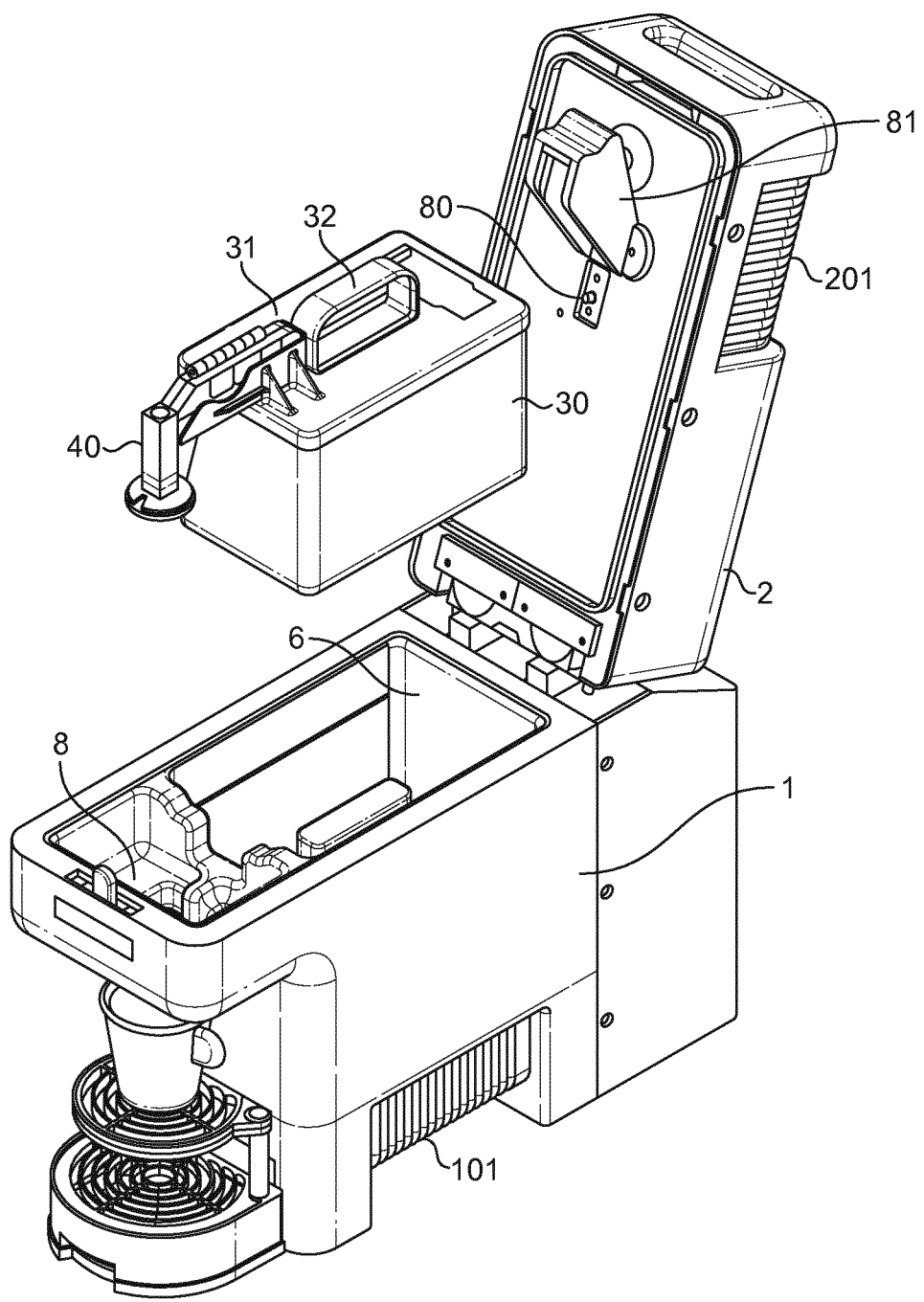
FIG. 9 shows a detailed view of the components in a milk unit used in a coffee-based beverage system according to the present invention.
Figure 10:
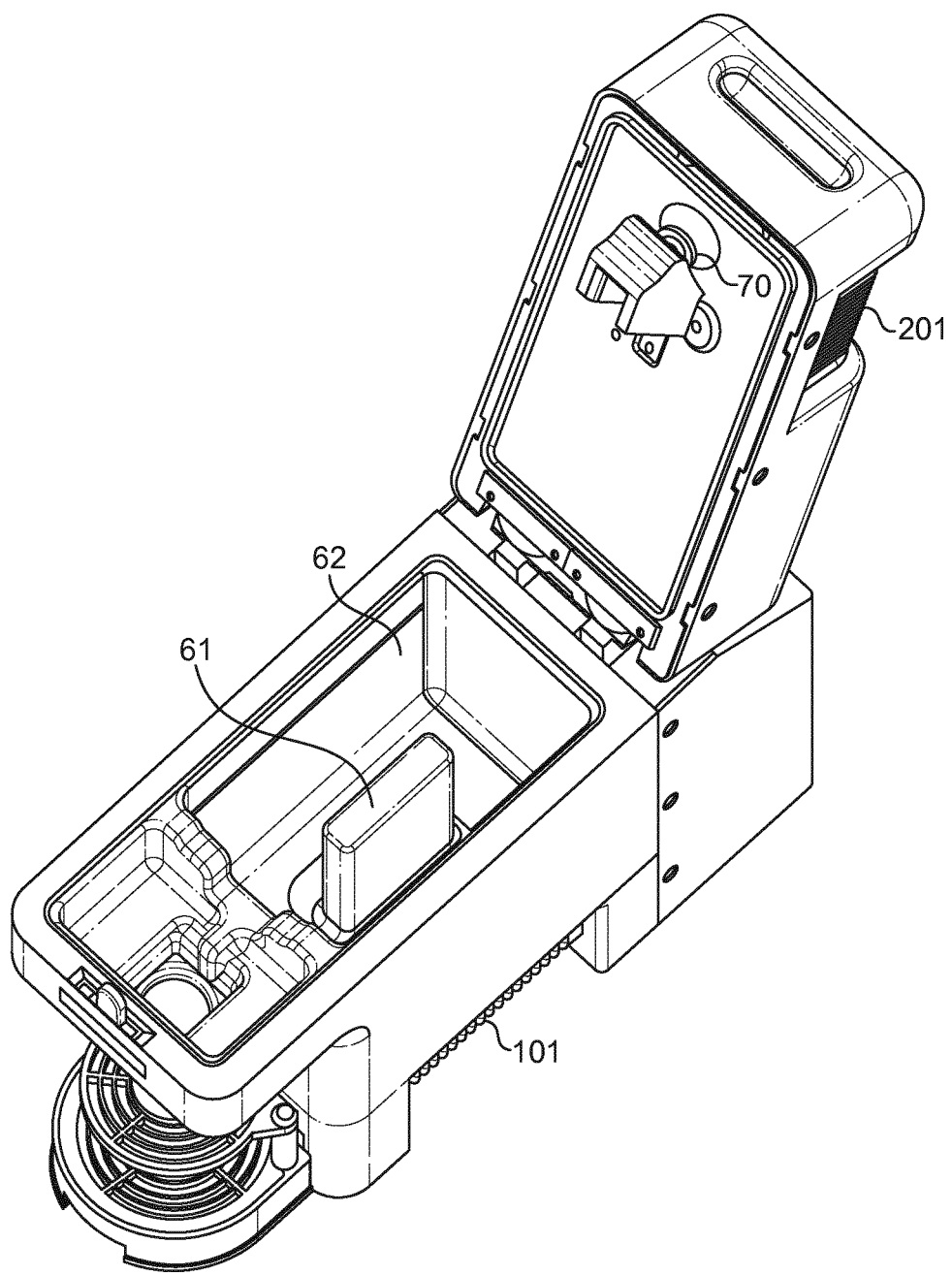
FIG. 10 shows a detailed view of the inner configuration in a milk unit used in a coffee-based beverage system according to the present invention.

Referring now to FIGS. 9 and 10, the insertion of the fluid container 30 together with the foaming device 40 is shown in detail. Typically, the fluid container 30 comprises a cover 31 with a handle 32 for allowing an easy insertion and removal of the mentioned container 30. FIG. 10 shows a second view with the primary refrigerated compartment 6 without the fluid container 30 having been inserted. In order to better cool the fluid, typically milk, the fluid container 30 comprises a cavity cooperating with a dedicated cooling block 61 in the primary refrigerated compartment 6 and connected to the first cooling unit 101. Furthermore, the cooling block 61 is welded together with a metallic sheet that covers the cooling walls 62 of the primary refrigerated compartment 6. This configuration allows a better and more homogeneous cooling of the fluid inside the fluid container 30. Preferably, the cooling block 61 is arranged centred in the primary refrigerated compartment 6, and so is the cavity it: this configuration is particularly advantageous as it accelerates cooling of the fluid in the container 30 as it is done from the centre of the fluid towards the exterior of it.

In the milk unit 10 of the system of the invention, the only parts that are in contact with the fluid and that have to be cleaned regularly, typically once a day are the fluid container 30 and the foaming device 40: these components do not need an automatic rinsing system integrated in the system, as they are completely removable and can be easily cleaned. Particularly, the foaming device 40 has a deployable configuration, allowing its deployment, typically in two halves, so cleaning can be made very easily.

Foaming in the unit 10 takes place in the foaming device 40, where the fluid (typically milk) is sucked by Venturi effect through injection of steam. Air is also added in a controlled manner through an air pipe so that it is possible to add air to the fluid in order to foam it, adding more or less quantity of air depending on the foaming characteristics targeted, or not to add any air at all so only milk is dispensed. Once steam is not injected any more, the remaining fluid in the foaming device 40 flows back to the fluid container 30 and the remaining fluid film in this foaming device is acceptable as it is constantly cooled down no there are no hygienic problems.

FIGS. 9 and 10 show the first cooling unit 101 intended to refrigerate the primary refrigerated container for the fluid (milk), and the second cooling unit 201 intended to refrigerate the secondary refrigerated compartment 8 where the foaming device 40 will be arranged. The fluid inside the fluid container 30 is cooled by the cooling walls 62 and also by the cooling block 61 arranged within its cavity. The foaming device 40 is in fact refrigerated by means of a metallic cooling block 81 arranged around the foaming device and refrigerated by the second cooling unit 20. This metallic cooling block 81 is also holding the foaming device 40 in place, assuring tightness and its permanent refrigeration.

In the milk unit 10, steam is generated by conventional known means (a watertank, a waterpump and a thermoblock connected to a steam pipe). The air pipe to the foaming device 40 is connected to a valve which controls the air injected in the foaming device 40: when only hot milk is desired (that is, no milk foam is targeted), the air entry is cut and only fluid goes through the foaming device, the fluid being then heated by means of the steam injected through the steam pipe. According to different possible embodiments of the invention, it is also possible that the fluid can be heated by other means different from steam, for example using conduction, radiation (using infrared or halogen lamps, for example), hot air, induction, etc.

As an alternative and less expensive solution, the milk unit 10 can be configured such that it comprises no cooling unit (so the machine is made in fact with a reduced size) and the fluid container and the foaming device are refrigerated externally, in a refrigerator or outside unit: after each milk and/or foam preparation, the fluid container and the foaming device are introduced in an external refrigerator for cooling. Still, the same easy cleaning is possible as the removal of the fluid container and the deployment of the foaming device remain unchanged.

Figure 11:
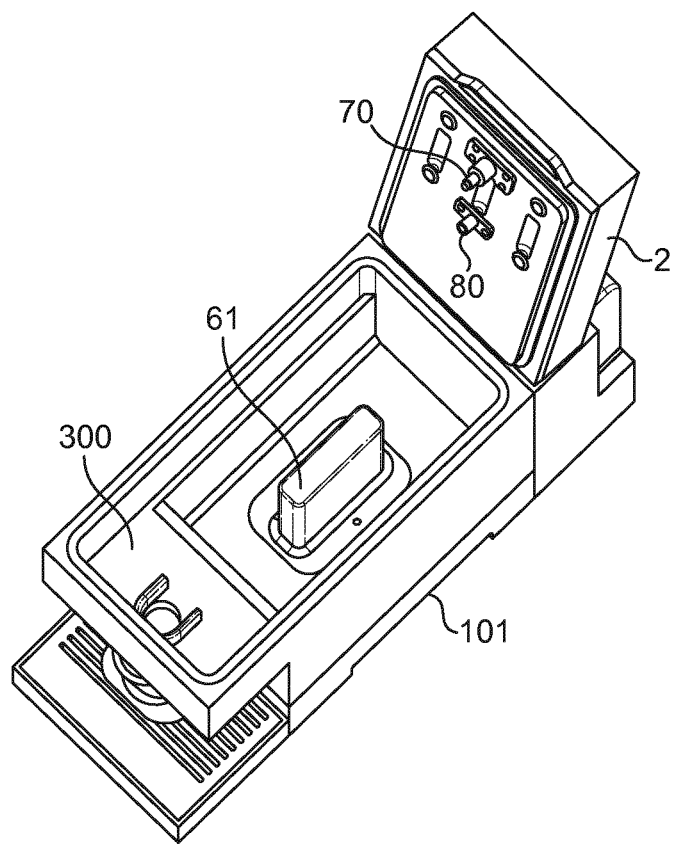
FIGS. 11, 12, 13 show detailed views of the configuration of a milk unit according to another embodiment, used in a coffee-based beverage system according to the present invention.
Figure 12:
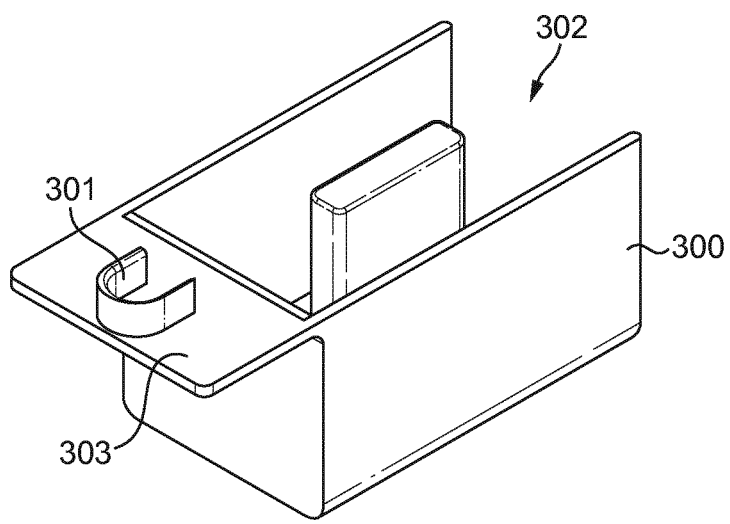
Figure 13:
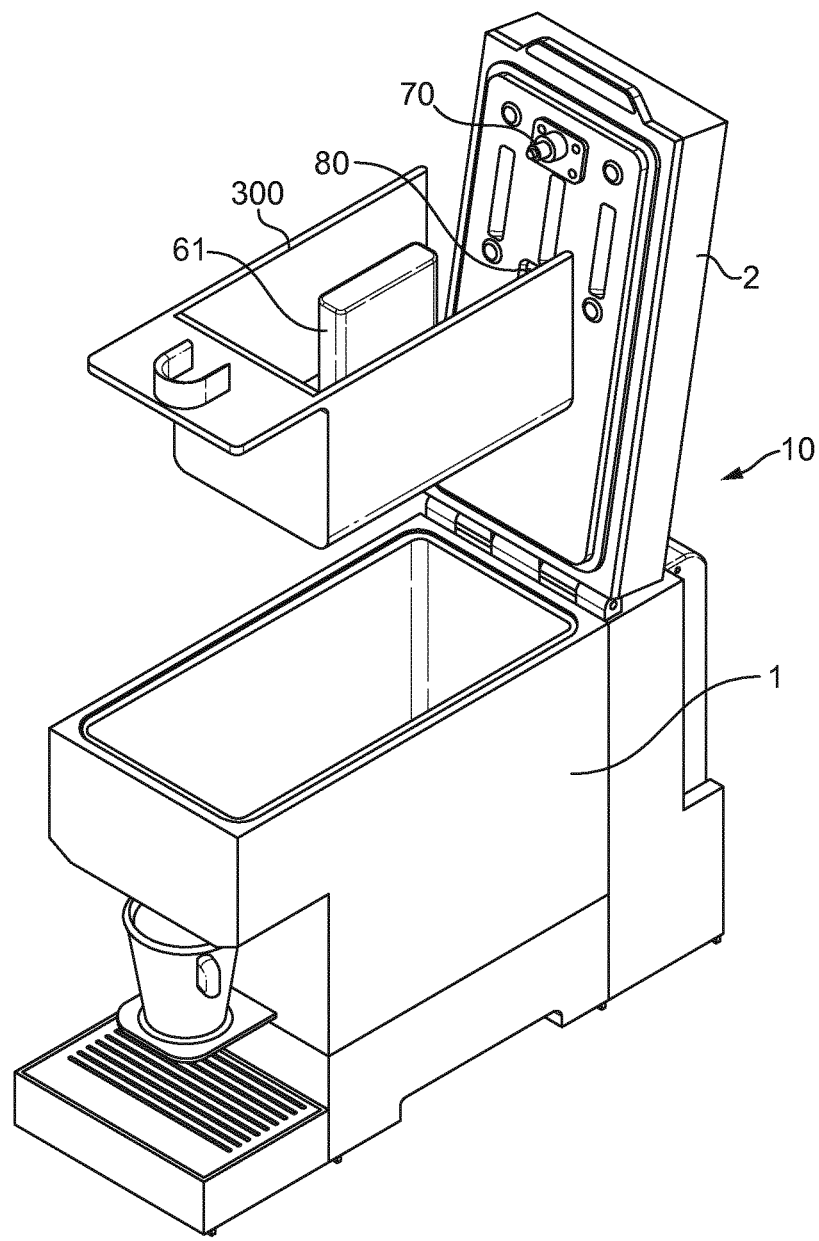

Another variant of the present invention is shown in FIGS. 11, 12 and 13 attached. According to this variant, there is only one cooling unit 101 arranged in the low part of the housing 1 of the milk unit 10. This cooling unit actually cools a block 300 comprising an inner volume 302 where the container 30 with the fluid will be arranged and a wing part 303, also refrigerated, comprising an insert part 301 to receive the outlet nozzle of the foaming device 40. Therefore, with this embodiment, only one cooling unit 10 is able to cool from below both the fluid in the container 30 and the foaming device 40 in its outlet. In a similar way, a cooling block 61 is also arranged in the inner volume 302 cooperating with the corresponding cavity (not shown) in the container 30. The top opening 2 of the milk unit 10, as represented in FIGS. 11 and 13, comprises the steam entry 70 and the air entry 80 that are automatically connected to corresponding matching entries in the foaming device 40. As it is clear, the top opening 2 does not comprise now any metallic block 81, which also presents the advantage of making this top opening 2 much lighter. This embodiment of the milk unit 10 comprises now only one compartment, inner volume 302, corresponding to the primary compartment 6 in the previous embodiment, where the fluid container 30 is arranged.

According to the invention, the air and steam entries are provided directly through the top opening 2 so direct automatic connection to the foaming device 40 is made by simply closing the top opening 2 of the machine. However, it is also possible and should be comprised within the scope of the present invention, that there are connections done manually by the user from the steam and air entries 70, 80 to the foaming device 40.

Although the present invention has been described with reference to preferred embodiments thereof, many modifications and alternations may be made by a person having ordinary skill in the art without departing from the scope of this invention which is defined by the appended claims.

The invention claimed is:

1. A beverage system for providing beverage recipes, the beverage system comprising a foamable fluid unit and one or more beverage units,
   the foamable fluid unit comprising a fluid system configured to circulate a foamable fluid through the foamable fluid unit, the foamable fluid unit further comprising a foaming device configured for preparation of a foamed fluid from the foamable fluid, the foamable fluid unit further comprising a fluid delivery outlet:
   wherein the foamable fluid unit is configured to provide the foamed fluid directly into a container, the fluid system in the foamable fluid unit being continuously refrigerated up to the fluid delivery outlet during the preparation of the foamed fluid and during stand-by of the beverage system; and
   the one or more beverage units are configured to dispense a beverage over the foamed fluid which has been provided into the container, without the beverage passing through any refrigerated area of the foamable fluid unit,
   wherein the beverage system comprises a top opening provided with an air entry and a steam entry respectively configured to cooperate with corresponding air and steam entries in the foaming device of the foamable fluid unit when the top opening closes over the foaming device.

2. The beverage system according to claim 1 wherein the fluid delivery outlet is configured for delivering the foamed fluid directly into the container, the one or more beverage units comprising one or more beverage outlets separate from each other, separate from the fluid delivery outlet, and configured for delivering the beverage over the foamed fluid into the container.

3. The beverage system according to claim 1 comprising a positioning area for the container depending on a size of the container, independently of a beverage recipe that will be prepared.

4. The beverage system according to claim 1, wherein the foamable fluid unit and the one or more beverage units are modularly configured, the one or more beverage units being configured to work independently from the foamable fluid unit.

5. The beverage system according to claim 1, wherein the foamable fluid in the foamable fluid unit is milk, and the beverage dispensed by the one or more beverage units is coffee.

6. The beverage system according to claim 1, wherein the foamable fluid unit comprises two distinct cooling units configured to refrigerate a fluid container where the foamable fluid is kept and the foaming device where the foamable fluid is foamed, separately from the fluid container.

7. The beverage system according to claim 6 wherein the two distinct cooling units comprise one cooling unit configured to refrigerate a primary compartment where the fluid container is arranged and another cooling unit configured to refrigerate a cooling block configured to contour and refrigerate the foaming device.

8. The beverage system according to claim 7 wherein the primary compartment comprises a cooling block cooperating with a cavity in the fluid container, and the primary compartment further comprising cooling walls refrigerating the sides of the fluid container.

9. The beverage system according to claim 1 wherein the foamable fluid unit comprises one cooling unit configured to refrigerate a block, the block comprising an inner volume to receive a fluid container where the foamable fluid is kept, and the block further comprising an insert part configured to receive the foaming device.

10. The beverage system according to claim 1 further comprising at least one valve to control at least one of the air and steam entries in the top opening.

11. The beverage system according to claim 6 wherein the foaming device comprises at least a first body and a second body comprising cavities configured to define fluid conduits when the first and second bodies are assembled together; the first and second bodies being joined by a joining element allowing folding and unfolding of the first and second bodies a plurality of times.

12. The beverage system according to claim 11 wherein the joining element comprises a hinge.

13. The beverage system according to claim 12 wherein the joining element further comprises at least one clamping element.

14. The beverage system according to claim 11 wherein the first and second bodies are configured as halves comprising the cavities, the cavities being complementary cavities that constitute the fluid conduits when the first and second bodies are brought together.

15. The beverage system according to claim 2, further comprising a positioning tray configured to position the container underneath the fluid delivery outlet while the container is also underneath at least one of the one or more beverage outlets.

16. The beverage system according to claim 1, further comprising a fluid container where the foamable fluid is kept, the system configured such that the fluid container and the foaming device are the only parts of the system that contact the foamable fluid.

* * * * *